United States Patent [19]
Yang

[11] Patent Number: 5,338,045
[45] Date of Patent: Aug. 16, 1994

[54] DEVICE FOR APPLICATION OF MECHANICAL AND MAGNETIC FORCES TO A FIXTURE

[76] Inventor: Tai-Her Yang, 5-1 Taipin St., Si-Hu Town Dzan-Hwa, Taiwan

[21] Appl. No.: 962,122

[22] Filed: Oct. 16, 1992

[51] Int. Cl.⁵ .............................................. B23B 31/00
[52] U.S. Cl. .................................... 279/128; 279/126
[58] Field of Search ............... 279/128, 126, 137, 158

[56] References Cited

U.S. PATENT DOCUMENTS

| | | | |
|---|---|---|---|
| 2,228,195 | 1/1941 | Blood | 279/128 |
| 2,561,769 | 7/1951 | Anderson | 279/128 X |
| 2,609,430 | 9/1952 | Bower | 279/128 X |
| 2,666,352 | 1/1954 | Philips | 279/128 X |
| 2,795,740 | 6/1957 | Bohli et al. | 279/128 X |
| 2,893,551 | 7/1959 | Pirwitz | 279/128 X |
| 2,918,610 | 12/1959 | Briggs | 279/128 X |
| 3,065,960 | 11/1962 | Miller | 279/128 X |
| 4,476,762 | 10/1984 | Anderson, III et al. | 279/128 X |

FOREIGN PATENT DOCUMENTS 1542701  2/1990  U.S.S.R. ............................. 279/128

*Primary Examiner*—Timothy V. Eley
*Attorney, Agent, or Firm*—Leonard Bloom

[57] ABSTRACT

A compound locking structure and applied device of mechanical and magnetic suction for fixture with a bearing face for workpiece being made into a magnetic sucking plate structure to enable the fixture to have mechanical chucking and magnetic sucking functions, and both functions can be operative alternatively or simultaneously subject to the control device.

10 Claims, 5 Drawing Sheets

DEVICE FOR APPLICATION OF MECHANICAL AND MAGNETIC FORCES TO A FIXTURE

SUMMARY OF THE INVENTION

The present invention relates to a compound holding structure and device for application of mechanical and magnetic forces to a fixture, and particularly to a fixture with a magnetic plate disposed in a plane to enable the fixture to have mechanical clamping and magnetic attracting functions. Both functions can be operative alternatively or simultaneously to provide for the following applications subject to the control device, including:

(1) selecting either a mechanical force for driving the clamping means or a magnetic force for holding the workpiece independently.

(2) rough shearing and fine shearing processes—i.e., to apply a mechanical force for clamping the workpiece for initial processing and then, changing to magnetic attraction for subsequent processing.

(3) holding the workpiece with a magnetic force and clamping the workpiece with a mechanical force simultaneously to firmly hold the workpiece from two directions.

(4) applying a magnetic force for attracting the workpiece and also clamping the workpiece with a mechanical force to minimize deformation of the workpiece. If further sophisticated processing is required, the mechanical clamping force may be reduced or removed while maintaining the magnetic force for sophisticated processing.

(5) adjusting the amount of magnetic force through the control device so as to change the amount of deformation before or during processing.

(6) providing at least two sets of fixtures having mechanical clamping and magnetic attracting features for alternative attracting/clamping in order to move the workpiece from one set to another set of fixtures in order to change the side of workpiece for processing whereby each side of workpiece can be processed.

(7) providing a manually controlled or an electrical-controlled interface device for accepting electrical-control commands to execute the functions (1) thru (6).

DETAILED DESCRIPTION OF PREFERRED EMBODIMENTS

Figure 1:
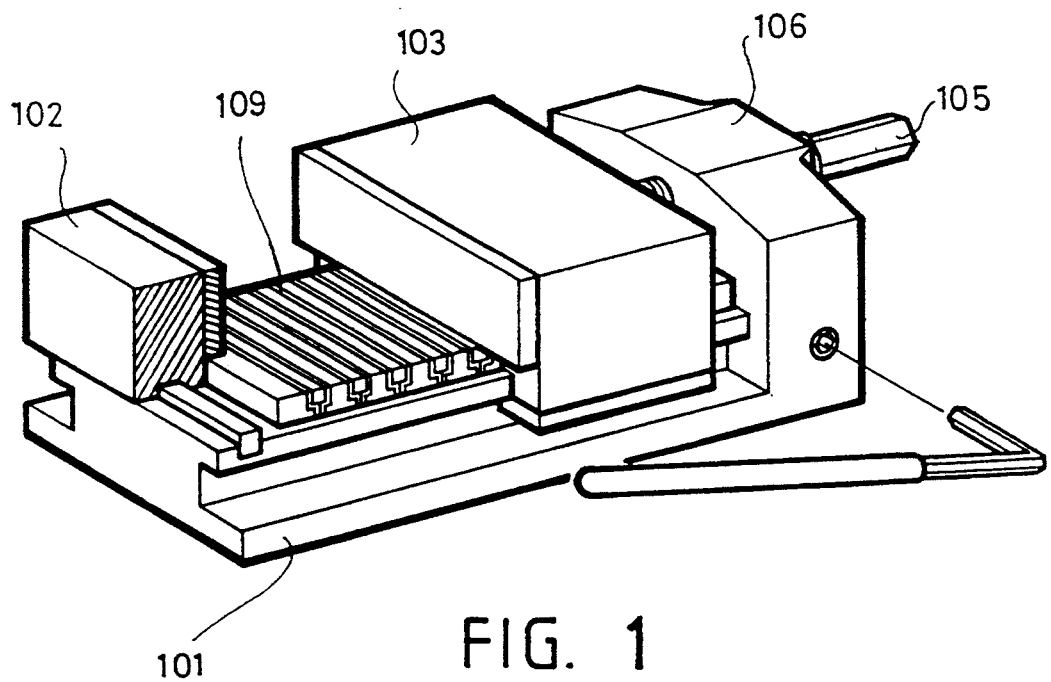
FIG. 1 is perspective view showing the embodiment of the compound holding structure and device for application of mechanical and magnetic forces to a fixture.
Figure 2:
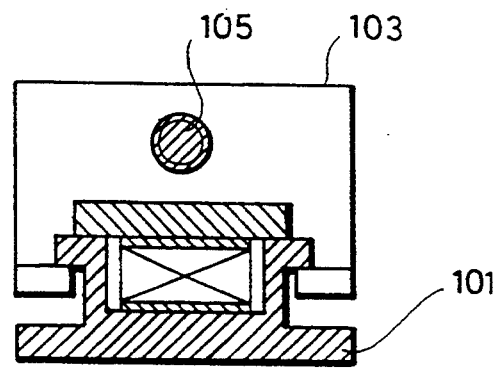
FIG. 2 is a front view of FIG. 1.
Figure 3:
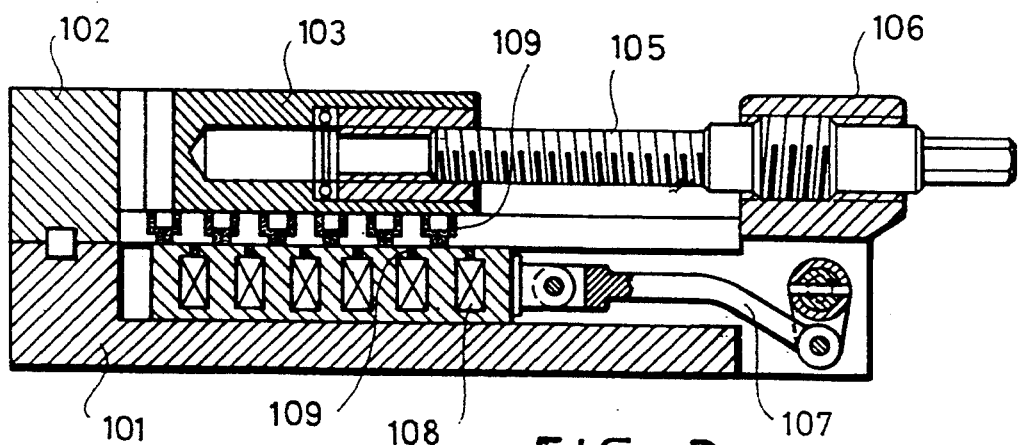
FIG. 3 is a side view of FIG. 1.
Figure 4:
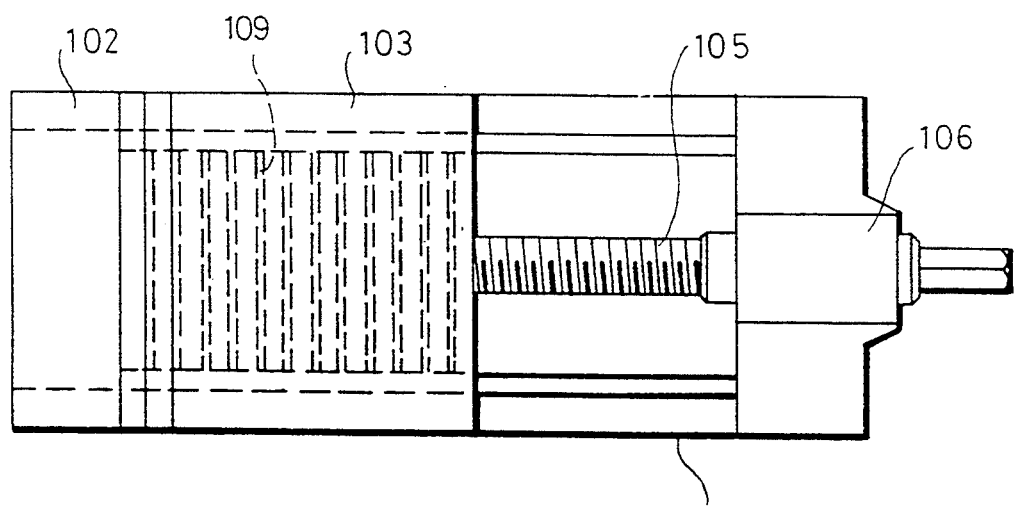
FIG. 4 is a bottom view of FIG. 1.

In general, the workpiece has to be fixed before processing and various kinds of fixtures have been designed for this application. The fixture is often designed to clamp the workpiece with mechanical or magnetic forces. Examples of mechanical clamping are:

manually operated mechanical means including a worm assembly or a cam assembly or fluid-driving elements or links for driving the chucking block to clamp the workpiece;

fluid pressure source from a motor or a power pump for driving the chucking block to clamp the workpiece.

Examples of magnetic attraction are:

electrical power for magnetically attracting the workpiece or for driving the chucking block to clamp the workpiece;

holding the workpiece with a permanent magnet.

The above-mentioned mechanical fixtures often result in the deformation of workpiece so that they are commonly applied to rough and fine processing, and are also applied to sophisticated processing under special structural conditions. Magnetic attractive means are often applied to light shearing and sophisticated processing during the final stage due to the large magnetic attraction area, the mean force applied to the workpiece and smaller deformation of workpiece. However, as is known, during the processing, the fewer times the workpiece is removed from the fixture, the greater is the economy of working time and labor and better precision is attained. The present invention is a newly-invented fixture with compound functions of mechanical clamping and magnetic attraction, which can apply following functions of the workpiece:

(1) selecting either a mechanical force for driving the clamping means or a magnetic force for holding the workpiece independently.

(2) rough shearing and fine shearing processes—i.e., to apply a mechanical force for clamping the workpiece for initial processing and then, changing to magnetic attraction for subsequent processing.

(3) holding the workpiece with a magnetic force and clamping the workpiece with a mechanical force simultaneously to firmly hold the workpiece from two directions.

(4) applying a magnetic force for attracting the workpiece and also clamping the workpiece with a mechanical force to minimize deformation of the workpiece. If further sophisticated processing is required, the mechanical clamping force may be reduced or removed while maintaining the magnetic force for sophisticated processing.

(5) adjusting the amount of magnetic force through the control device so as to change the amount of deformation before or during processing.

(6) providing at least two sets of fixtures having mechanical clamping and magnetic attracting features for alternative attracting/clamping in order to move the workpiece from one set to another set of fixtures in order to change the side of workpiece for processing whereby each side of workpiece can be processed.

(7) providing a manually controlled or an electrical-controlled interface device for accepting electrical-control commands to execute the functions (1) thru (6).

The present invention may be better understood through the following detailed specification together with the accompanying drawings.

The structure includes:

A main body 101 which may be secured to the work table or connected securely to the machine body or rotatable shaft. At least one set of fixed jaws and movable jaws for chucking (clamping) the workpiece. The main body has a controllable permanent magnet 108 (or external electrical exciting coil), and workpiece. The faces with the magnetic attracting function comprising gap stuffing 109 and a permanent magnet.

The fixed jaw 102 is at least one set installed on the main body 101 and may be a one-piece structure unitary with the main body 101 or the fixed jaw 102 may be removable.

The movable jaw 103 is at least one set slidably coupled to the main body 101 for clamping/releasing the workpiece relative to the fixed jaw 102. Alternately the fixed jaw 102 may be replaced with a movable jaw.

The means for driving the movable jaw 103 is a manually operated structure comprising a drive worm 105, a worth strut 106 and related elements, such as bearings, etc. The movable jaw 103 may also be driven by a hydraulic or pneumatic means. A motor may be used for driving a rotary source or driving a linear fluid power cylinder for pushing-/pulling the movable jaw directly for clamping for releasing the workpiece relative to the fixed jaw. An operating valve for the motor or fluid driving device may be a manually-controlled switch or may be connected to an electrical interface device for accepting electrical commands.

The magnetic attracting operational device has an arm 107 connected to the permanent type magnet 108. The magnetic attractive force of the permanent magnet against the workpiece can be controlled by manually moving the arm 107 to laterally position a greater or a lesser portion of the permanent magnet 108 with respect to the workpiece or by changing the strength of the electromagnet. The electromagnet strength is controlled by changing the shunt amount of a magnetic coil. When used with a current exciting coil, a switch device is provided for attracting or releasing the workpiece. Said switch device (not shown) may be manually controlled or connected to an electrical interface device (not shown) for accepting electrical commands. The aforesaid coil exciting type magnet may further control its exciting current or alternate its winding to change the magnetic attraction force.

Figure 6:
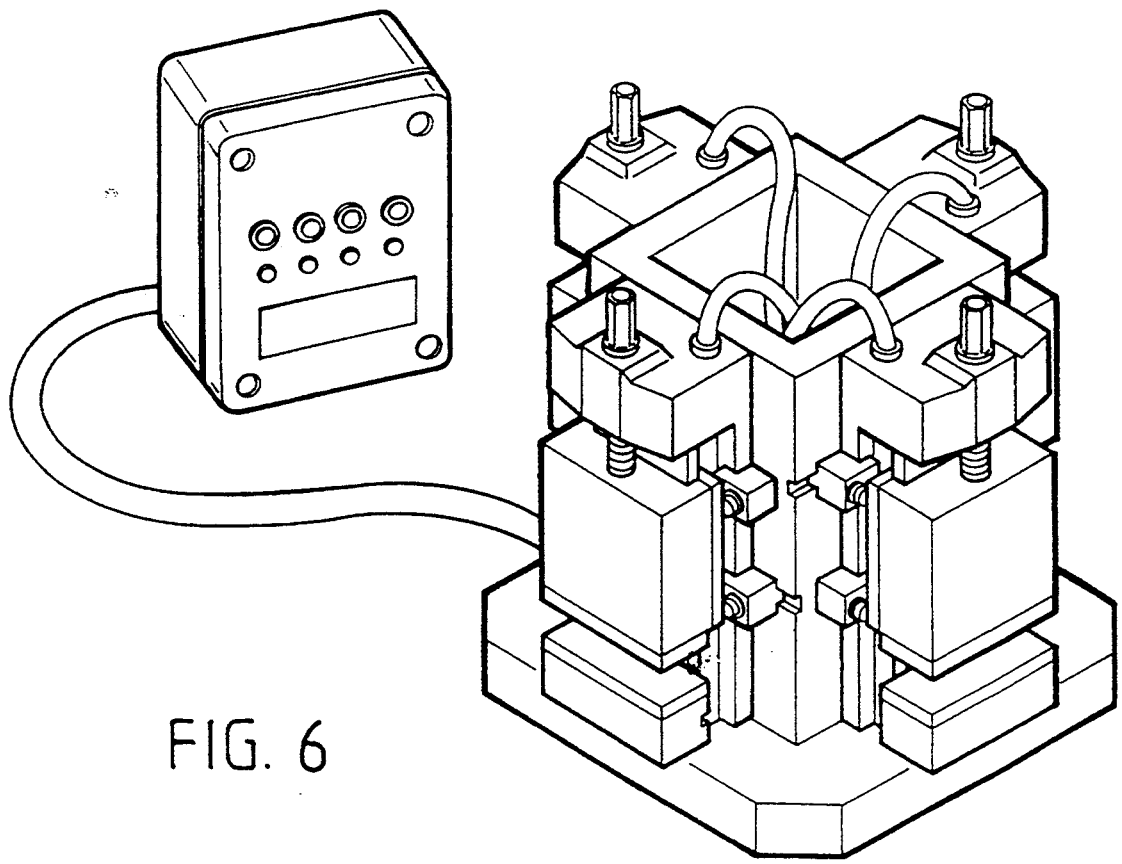
FIG. 6 is an embodiment of vertical polyhedral combination of the fixture of FIG. 1.
Figure 5:
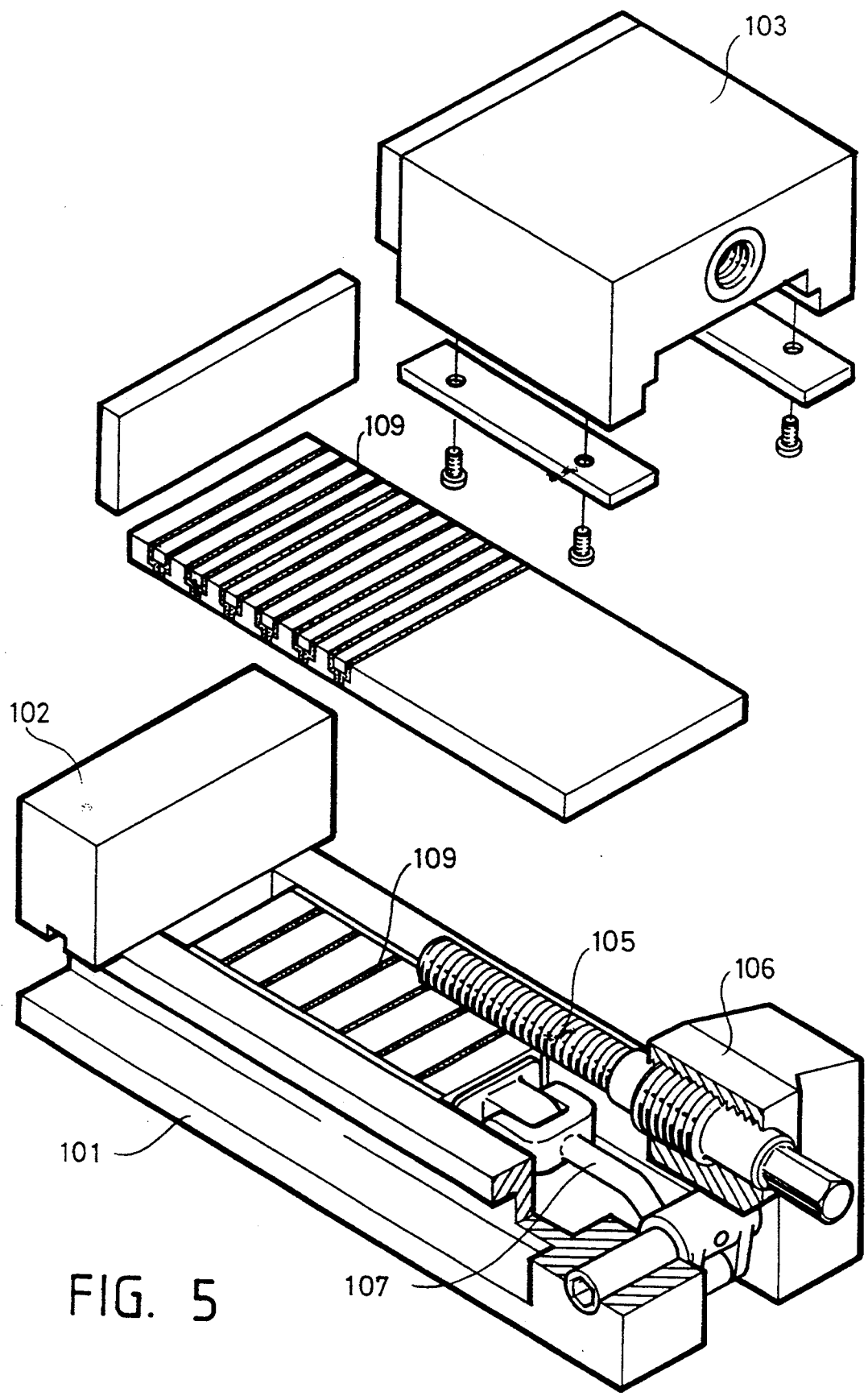
FIG. 5 is an exploded view of FIG. 1 partially broken away to show the drive for the movable jaw.
Figure 7:
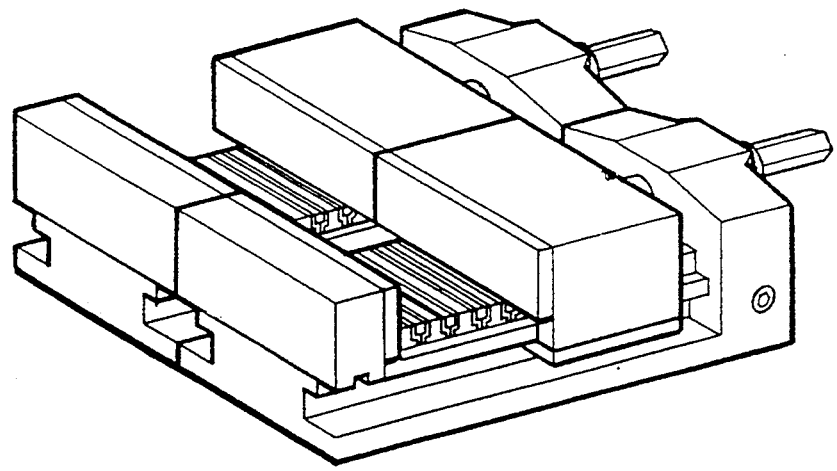
FIG. 7 is an embodiment showing the side-by-side arrangement of two fixtures of FIG. 1.

We may further achieve a vertical multi-surface assembly as the embodiment in FIG. 6 through plural assembly of the structure. Such multi-surface assembly is often applied to mechanical processing equipment with a positioning and rotary working table. The plural plane assembly shown in FIG. 7 is for mass production and the total number of assemblies may be varied depending on the requirement.

Figure 8:
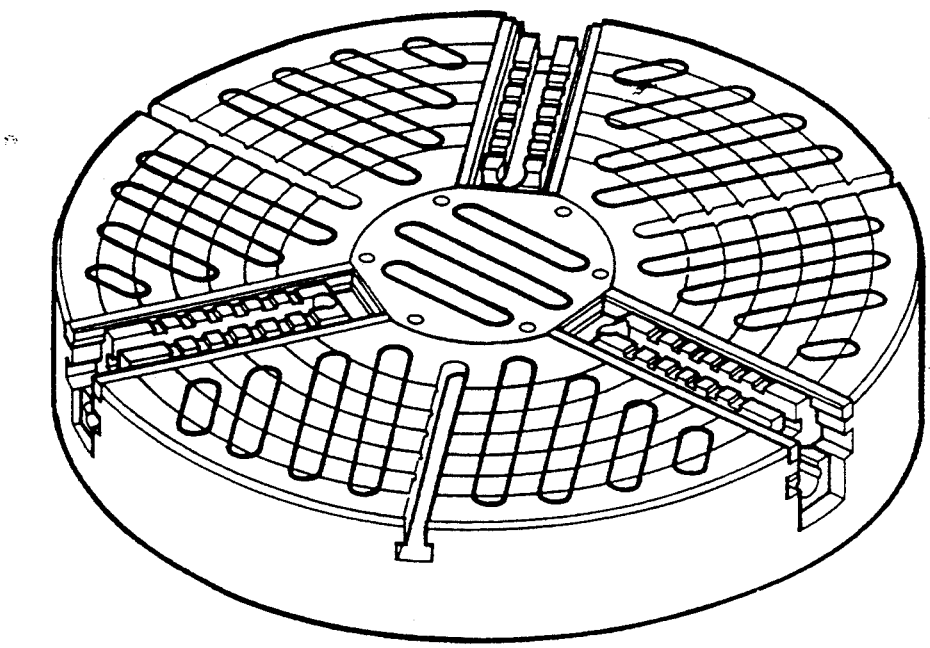
FIG. 8 is chuck plate which may be used with the fixture of FIG. 1.

Besides, the device may use a chuck as shown in FIG. 8 for clamping of the workpiece.

The driving structure and main body can be of a one-piece construction and fixed in combination, or may be an assembly type structure having a removable fixed jaw and movable jaw when the main body is used with the plane magnetic attracting plate.

Figure 9:
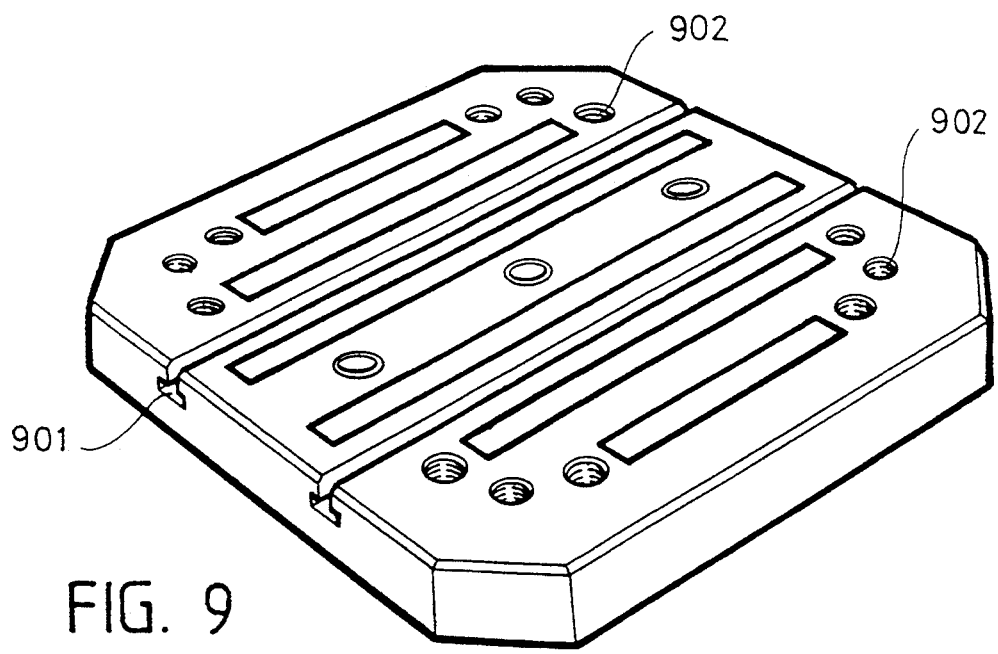
FIG. 9 is an embodiment showing a plane magnetic plate with tap holes and a T-slot.
Figure 10:
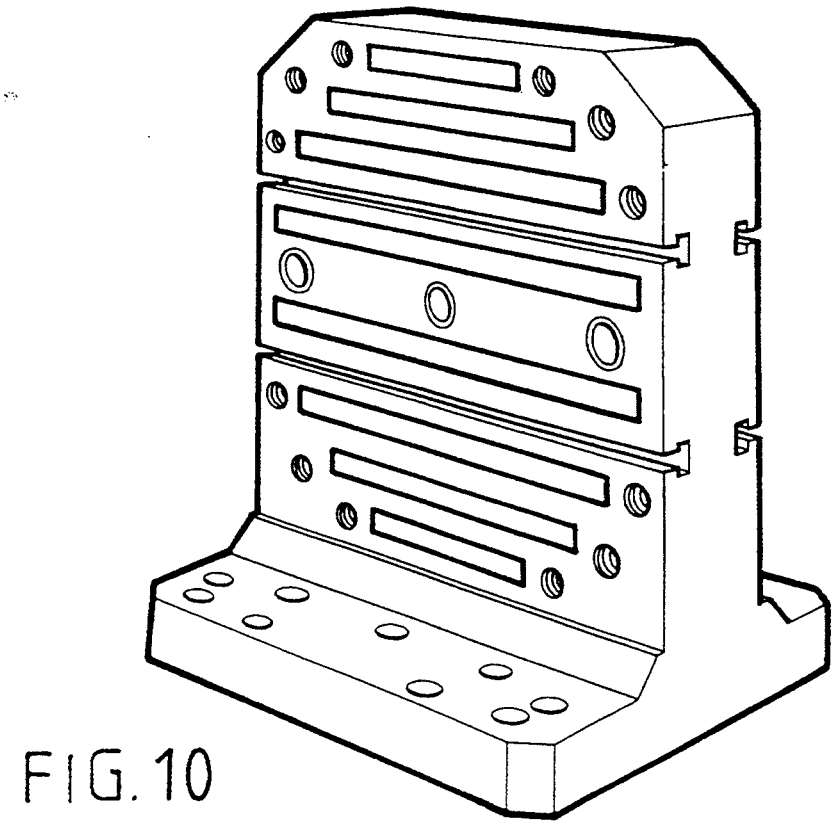
FIG. 10 is an embodiment showing a polyhedral structure for the device shown in FIG. 9.

Besides, it may also be composed of a plane magnetic plate with tap holes or a T-slot as a flexible fixture assembly as shown in FIG. 9 comprising:

A permanent magnet or magnetic coil exciting type magnetic attracting plate, mounted in a standard type tap hole assembly 902 for mounting an auxiliary chuck or T-slot assembly 901. The structure also can be a multi-surface structure as the device of FIG. 9 shown in FIG. 10.

The flexible fixture assembly may be adapted to a conventional jaw type, a flexible clamping block, a flexible push-down type, etc.

The present invention provides a new design for a fixture to save working hours and labor and to advance the precision of processing a workpiece.

The foregoing description relates to embodiments of the invention which have been set but by way of example, not by way of description. It is to be understood that numerous other embodiments and variants are possible without departing from the spirit and scope of the invention, its scope being defined by the appended claims.

I claim:

1. A device for holding a workpiece, the device comprising a body having attached thereto a first jaw means and an opposed movable jaw means in a first plane, wherein the workpiece may be mechanically clamped between said jaw means, a magnetic unit movably mounted on the body in a second plane substantially perpendicular to the first plane, wherein the workpiece may be held magnetically by a variable force and further, control means wherein, as desired, the workpiece may be held mechanically, magnetically or combined mechanically/magnetically subject to the control means.

2. The device of claim 1, wherein the first jaw means is at least one fixed jaw mounted on the main body, the movable jaw means being at least one jaw slidably mounted on the main body and movable toward and away from the first jaw means.

3. The device of claim 2, wherein he movable jaw means is driven by a drive worm.

4. The device of claim 2, wherein the movable jaw means is driven by a fluid power cylinder.

5. The device of claim 2, wherein the movable jaw means is driven by an electric motor.

6. The device of claim 1, further comprising the magnetic unit having a permanent magnet disposed therein, the magnetic unit being connected to an arm for moving the magnetic unit laterally on the body such that the workpiece may be held by a desired portion of the magnetic unit, and the magnetic force holding the workpiece may be varied.

7. The device of claim 1, further comprising the magnetic unit having an electromagnet disposed therein, and further having power means connected to the electromagnet wherein the magnetic force holding the workpiece may be varied.

8. The device of claim 1, wherein the first jaw means are movable such that the device has at least two movable jaw means for moving toward and away from each other to clamp or release the workpiece between said jaw means.

9. The device of claim 1, wherein disposed on the body, there are a plurality of spaced-apart firs jaw means, each first jaw means having an opposed movable jaw means, and a corresponding plurality of magnetic faces mounted on the body such that a plurality of workpieces may be held simultaneously.

10. A device for holding a workpiece, the device comprising a body having attached thereto a first jaw means and an opposed movable jaw means in a first plane, wherein the workpiece may be mechanically clamped between said jaw means, the first jaw means being at least one jaw mounted on the main body, the movable jaw means being at least one jaw slidably mounted on the main body and movable toward and away from the first jaw means, a magnetic unit movably mounted on the body in a second plane substantially perpendicular to the first plane, wherein the workpiece may be held magnetically, the magnetic unit having a permanent magnet disposed therein, the magnetic unit being connected to an arm for moving the magnetic unit laterally on the body such that the workpiece may be held by a desired portion of the magnetic unit and the magnetic force holding the workpiece may be varied and further, control means wherein, as desired, the workpiece may be held mechanically, magnetically or combined mechanically/magnetically subject to the control means.

* * * * *